(12) United States Patent
Au et al.

(10) Patent No.: US 7,116,599 B1
(45) Date of Patent: Oct. 3, 2006

(54) HIGH SPEED FIFO SYNCHRONOUS PROGRAMMABLE FULL AND EMPTY FLAG GENERATION

(75) Inventors: Johnie Au, Cupertino, CA (US); Chia Jen Chang, San Jose, CA (US); Parinda Mekara, Sunnyvale, CA (US)

(73) Assignee: Cypress Semiconductor Corp., San Jose, CA (US)

( * ) Notice: Subject to any disclaimer, the term of this patent is extended or adjusted under 35 U.S.C. 154(b) by 623 days.

(21) Appl. No.: 09/957,587

(22) Filed: Sep. 20, 2001

(51) Int. Cl.
*G11C 7/00* (2006.01)

(52) U.S. Cl. .................................................. 365/221
(58) Field of Classification Search ............... 713/502, 713/600; 365/221
See application file for complete search history.

(56) References Cited

U.S. PATENT DOCUMENTS 5,311,475 A * 5/1994 Huang ...................... 365/221
5,355,113 A * 10/1994 McClure .................. 340/146.2
5,384,744 A * 1/1995 Lee .......................... 365/221
5,627,797 A * 5/1997 Hawkins et al. ............ 365/221
6,347,380 B1 * 2/2002 Chang et al. ............... 713/503

OTHER PUBLICATIONS

Johnie Au et al., "A High Speed Synchronous and Programmable State Machine for Generating Almost Empty Synchronous Flags in a Synchronous FIFO", U.S. Appl. No. 09/895,305, filed Jun. 30, 2001.
Johnie Au et al., "A High Speed Synchronous and Programmable State Machine for Generating Almost Empty Synchronous Flags in a Synchronous FIFO", U.S. Appl. No. 09/895,306, filed Jun. 30, 2001.
Johnie Au et al., "High Speed FIFO Synchronous Programmable Full and Empty Generation", U.S. Appl. No. 09/957,015, filed Sep. 20, 2001.

* cited by examiner

*Primary Examiner*—Lynne H. Browne
*Assistant Examiner*—Eric Chang
(74) *Attorney, Agent, or Firm*—Christopher P. Maiorana, PC

(57) ABSTRACT

An apparatus comprising a flag generation circuit configured to generate a full flag signal in response to (i) a read clock signal, (ii) a write clock signal and (iii) a look ahead bitwise comparison configured to detect when a read count signal and a write count signal are equal.

18 Claims, 3 Drawing Sheets

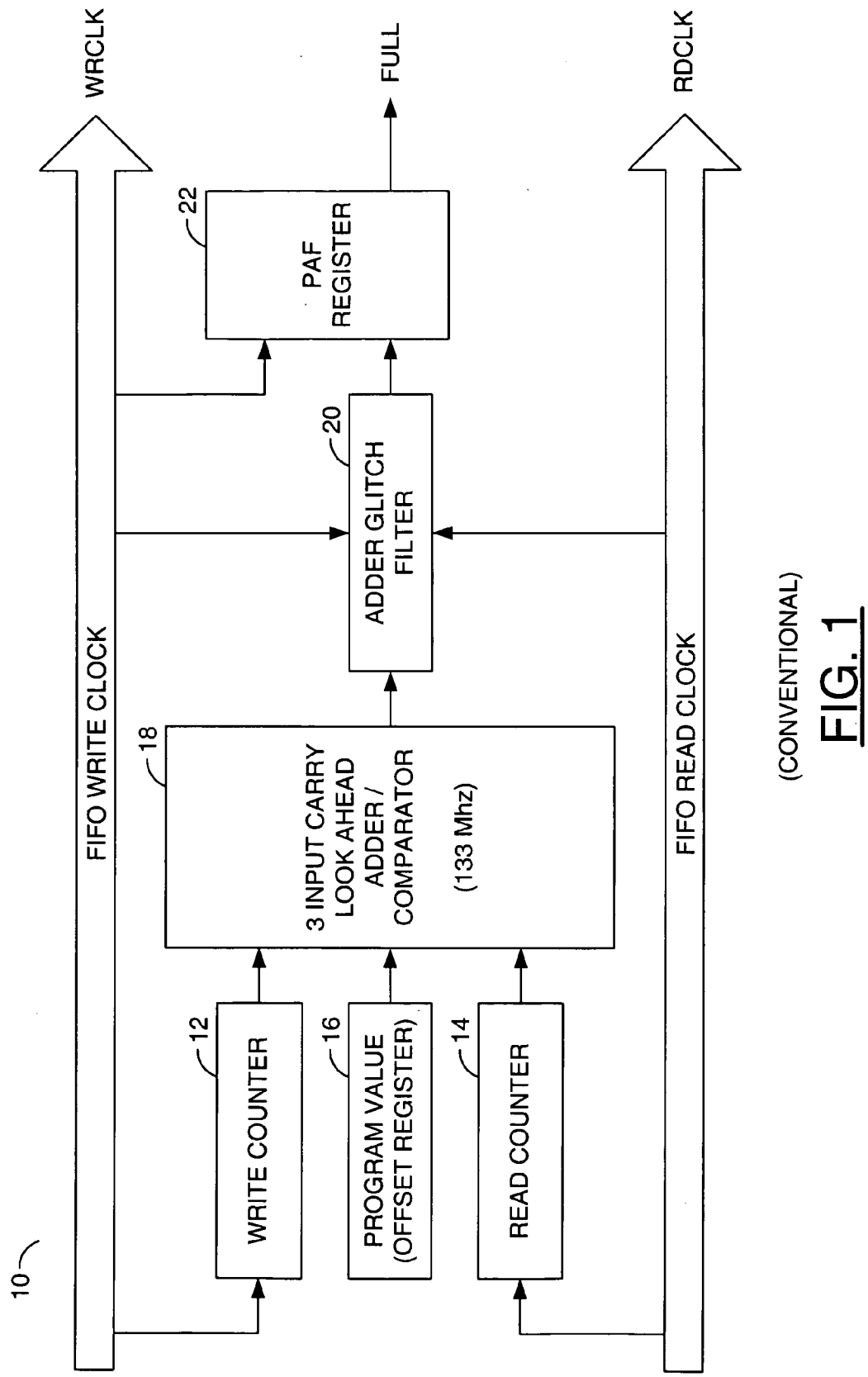
FIG. 1 (CONVENTIONAL)

HIGH SPEED FIFO SYNCHRONOUS PROGRAMMABLE FULL AND EMPTY FLAG GENERATION

CROSS REFERENCE TO RELATED APPLICATIONS

The present application may relate to co-pending U.S. Pat. No. 6,445,635, application Ser. No. 09/895,306, filed Jun. 29, 2001, and U.S. Pat. No. 6,525,980, which are each hereby incorporated by reference in their entirety.

FIELD OF THE INVENTION

The present invention relates to a method and/or architecture for generating flags in a memory generally and, more particularly, to a method and/or architecture for generating high speed almost full status flags in a first-in, first-out (FIFO) memory.

BACKGROUND OF THE INVENTION

First-in first-out (FIFO) memories provide a temporary buffer (or storage area) between communication systems. A programmable full flag of a FIFO can be used as an interrupt to warn the system when the FIFO buffer becomes almost full, which then blocks further write operations. Almost full flags are generated in real-time to prevent overflow of the buffer. Traditionally, read counters, write counters and an offset register are used to track the status of the FIFO.

Referring to FIG. 1, an almost full flag generation circuit 10 implementing a 3-input adder is shown. The circuit 10 includes a write counter 12, a read counter 14, a program value (i.e., an offset register) 16, a 3-input carry look ahead adder/comparator 18, an adder glitch filter 20 and a programmable almost full flag register 22. The circuit 10 receives a FIFO write clock WRCLK and a FIFO read clock RDCLK. The write counter 12 presents a value to the adder/comprator circuit 18 in response to the FIFO write clock WRCLK. The write counter 12 tracks the number of writes. The read counter 14 presents a value to the adder/comparator circuit 18 in response to the FIFO read clock RDCLK. The read counter 14 tracks the number of reads. The offset register 16 stores a user programmed offset value. The adder/comparator circuit 18 also receives the offset value from the register 16. The adder/comparator 18 presents an output to the programmable almost full register 22 via the adder glitch filter 20. The glitch filter 20 degrades performance of the circuit 10 (i.e., the glitch filter 20 is slow). The programmable almost full register 22 then presents the full status flag FULL. The almost full status flag FULL is obtained by the 3-input adder 18 which is in the critical path. The 3-input adder is slow and restricts the operational speed of the circuit 10.

Conventional almost-full flags that use a 3-input adder define the almost full flag as FULL=(WR−RD>(depth−offset)). Such an approach may have one or more of the following disadvantages of (i) being slow, (ii) consuming large area, and/or (iii) having wide glitches generated by the adder which need filtering, thereby degrading overall performance.

SUMMARY OF THE INVENTION

The present invention concerns an apparatus comprising a flag generation circuit configured to generate a full flag signal in response to (i) a read clock signal, (ii) a write clock signal and (iii) a look ahead bitwise comparison configured to detect when a read count signal and a write count signal are equal.

The objects, features and advantages of the present invention include providing a method and/or architecture for generating high speed almost full status flags in a FIFO that may (i) use a comparator to generate look ahead signals used by the almost full flag generation, (ii) use state machines (e.g., asynchronous state machines) to generate the almost full flag, (iii) implement a user programmable offset directly into the read counter upon programming, (iv) implement a shadow register for storing the offset value, (v) achieve high speed operation (e.g., 266 MHz) and/or (vi) minimize logic hazards (e.g., glitches).

BRIEF DESCRIPTION OF THE DRAWINGS

These and other objects, features and advantages of the present invention will be apparent from the following detailed description and the appended claims and drawings in which:

FIG. 1 is a block diagram of a conventional programmable almost full flag generation circuit;

DETAILED DESCRIPTION OF THE PREFERRED EMBODIMENTS

Figure 2:
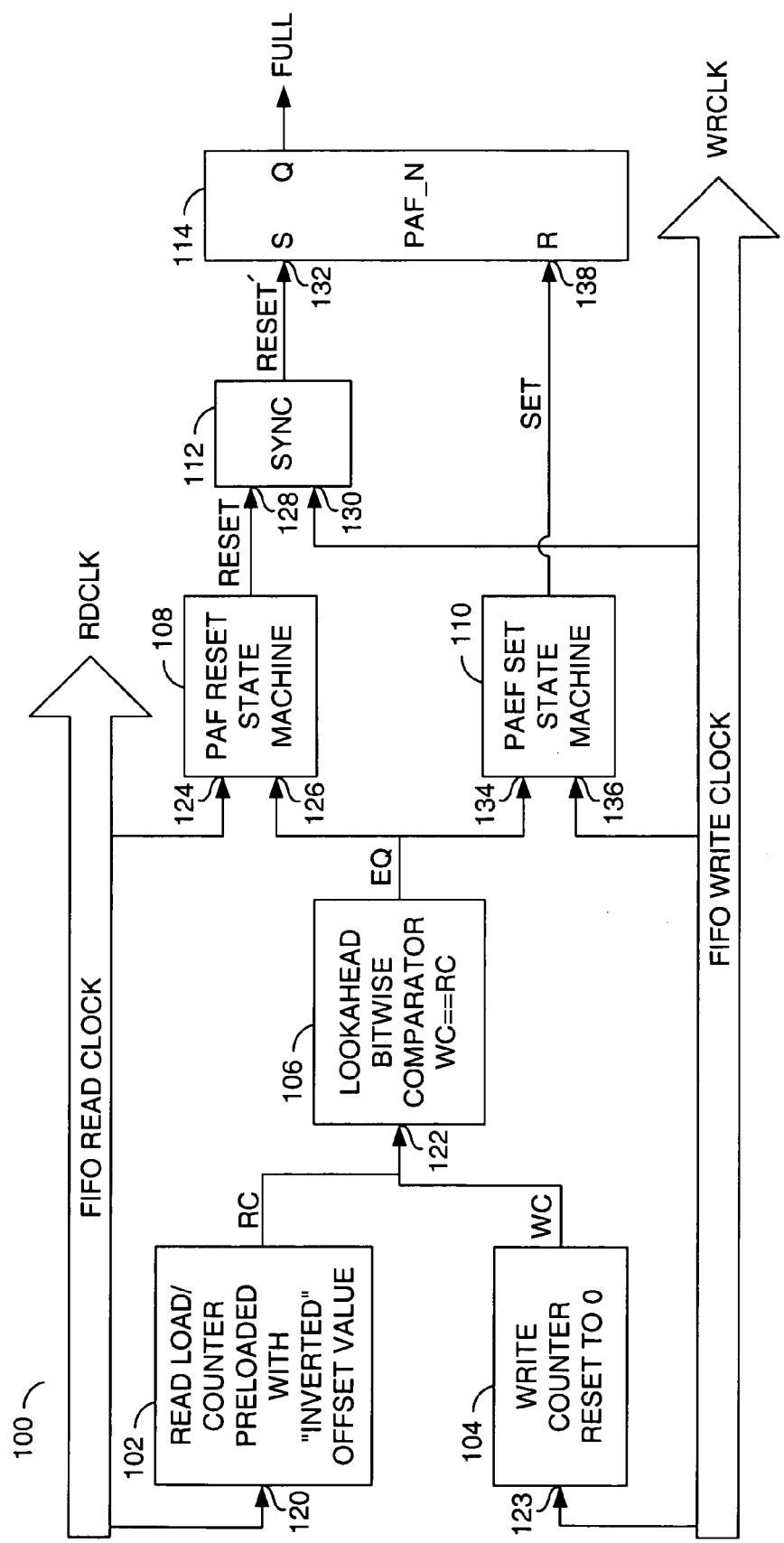
FIG. 2 is a block diagram of a preferred embodiment of the present invention.

Referring to FIG. 2, a block diagram of a circuit (or system) 100 is shown in accordance with a preferred embodiment of the present invention. The circuit 100 may be configured to generate high speed almost full status flags in a FIFO (to be discussed further in connection with FIGS. 3(a–c)). The circuit 100 may be configured to provide high speed FIFO synchronous programmable almost full flag generation. The flag generation circuit 100 may comprise a comparator and an asynchronous state machine. Therefore, the flag generation circuit 100 may remove the traditional adder and filtering (as illustrated in the background) from the critical timing path.

The circuit 100 generally comprises a read load/counter block (or circuit) 102, a write counter block (or circuit) 104, a comparator block (or circuit) 106, a state machine 108, a state machine 110, a synchronization block (or circuit) 112 and a latch 114. The circuit 100 may be configured to receive a FIFO read clock (e.g., RDCLK) and a FIFO write clock (e.g., WRCLK). The circuit 100 may also generate an output (e.g., FULL). The output FULL may be implemented as a programmable almost full status flag.

The read load/counter circuit 102 may have an input 120 that may receive the read clock RDCLK. The read load/counter circuit 102 may be preloaded with an offset value. In one example, the offset value may be inverted (e.g., a complement). The offset value may be programmable. The "inverted" programmable offset value may be preloaded into the read load/counter 102. The read load/counter 102 may then be incremented from the "inverted" offset value. Since the offset for the programmable almost full status flag FULL is generally specified as space within a FIFO, translation of the free space into a number of words by depth-offset may be the "inverted" offset value. The read load/counter circuit 102 may present a signal (e.g., RC) to an input 122 of the comparator 106. The signal RC may be a read count signal (or pointer).

The write counter 104 may have an input 123 that may receive the signal WRCLK. The write counter 104 may be reset to 0 in response to the write clock WRCLK. The write counter 104 may also present a signal (e.g., WC) to the input 122 of the comparator 106. The signal WC may be a write count signal (or pointer). The comparator 106 may be configured as a look ahead bitwise comparator. The comparator 106 may be configured to compare the signals WC and RC (e.g., WC==RC). The comparator 106 may then generate a signal (e.g., EQ). The signal EQ may be configured as a look ahead signal. The look ahead signal EQ may be used to generate the almost full status flag FULL.

The state machine 108 may be configured as a programmable almost full reset state machine. The state machine 108 may have an input 124 that may receive the signal RDCLK and an input 126 that may receive the signal EQ. The state machine 108 may be configured to generate a signal (e.g., RESET) in response to the signal RDCLK and the signal EQ. The signal RESET may be presented to an input 128 of the synchronization block 112. The synchronization block 112 may also have an input 130 that may receive the signal WRCLK. The synchronization block 112 may be configured to synchronize the signal RESET to the write clock WRCLK.

The synchronization block 112 generally comprises an SR latch followed by a register clocked by the write clock WRCLK (both of which are not shown). The SR latch of the synchronization block 112 may be reset after the register of the synchronization block 112 has been clocked high. The synchronization block 112 may present a signal (e.g., RESET') to an input 132 of the latch 114. The signal RESET' may be presented to a "set" (e.g., input S) of the latch 114.

The state machine 110 may be configured as a programmable almost empty flag set state machine. The state machine 110 may have an input 134 that may receive the signal EQ and an input 136 that may receive the signal WRCLK. The state machine 110 may generate a signal (e.g., SET) that may be presented to an input 138 of the latch 114. The signal SET may be presented to a "reset" (e.g., input R) of the latch 114. The latch 114 may be configured to generate the almost full signal FULL in response to the signals RESET' and SET. The latch 114 may be configured as an SR latch. However, the latch 114 may be configured as another appropriate type device in order to meet the design criteria of a particular implementation. Examples of the state machines 108 and 110 may be found in co-pending application Ser. No. 09/895,306, filed Jun. 29, 2001, U.S. Pat. Nos. 6,445,635; 5,712,992; 5,809,339; 5,627,797; 5,850,568 and/or 5,852,748, each of which is incorporated by reference in its entirety.

The circuit 100 may be implemented to control a status of a FIFO. As the FIFO reaches almost full (e.g., at a next write cycle the FIFO will be full), the set state machine 110 may generate the pulse SET at a next rising edge of the write clock WRCLK. The pulse SET generally resets the SR latch 114 to generate an active LOW on the programmable full flag FULL. The active LOW state of the signal FULL may indicate an active state of the FIFO.

Similarly, when the FIFO becomes not almost full (e.g., the FIFO has more than offset+1 spaces available) the reset state machine 108 may generate the pulse RESET at a next rising edge of the read clock RDCLK. The read clock domain pulse RESET may then be synchronized by the write clock WRCLK to generate the signal RESET', which then sets the SR latch 114 to generate an active HIGH on the programmable full flag FULL. The active HIGH state of the signal FULL may indicate an inactive state of the FIFO.

The reset state machine 108 may be inhibited (or blocked) when the flag FULL is HIGH. The set state machine 110 may be inhibited (or blocked) when the external flag FULL is LOW. Such a configuration may ensure that the SR-latch 114 may never receive simultaneous RESET' and SET pulses that may lead into an illegal state for the SR latch 114.

Both the set and reset state machines 108 and 110 may enhance typical empty/full flag state machines. However, typical empty/full flag state machines may need additional logic to allow internal synchronous retransmit functions. For example, an addition SR-latch may need to be attached to the set path (e.g., RESET) to remember if the FIFO has ever gone from not almost full to almost full after a master reset cycle. Upon retransmit, if the signal RESET is active, the state machine 110 may trigger the pulse SET to recover an almost full status (e.g., a logic LOW) of the programmable almost full flag FULL, if the FIFO is almost full. The retransmit action may also trigger the read counter 102 to reload the user programmed "inverted" offset value from a shadow offset register (not shown) that may be configured to store the "inverted" value during programmable cycles (e.g., either preload, parallel or serial programming).

Figure 3A:
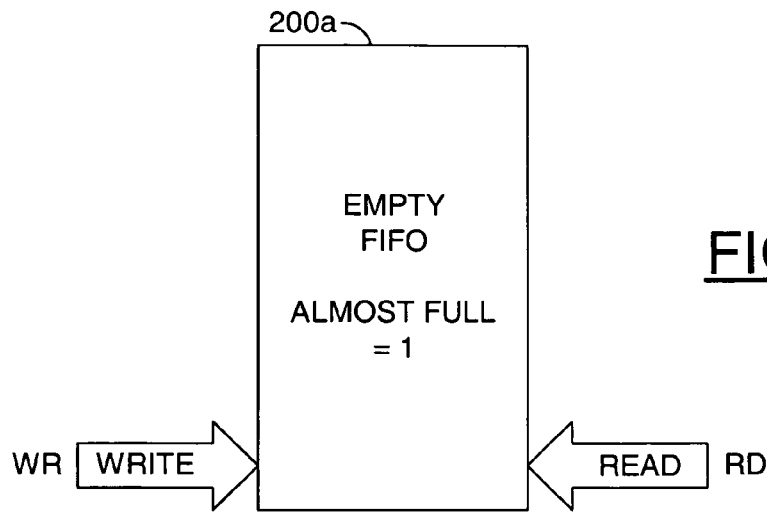
FIGS. 3(a–c) are exemplary implementations of the present invention.
Figure 3B:
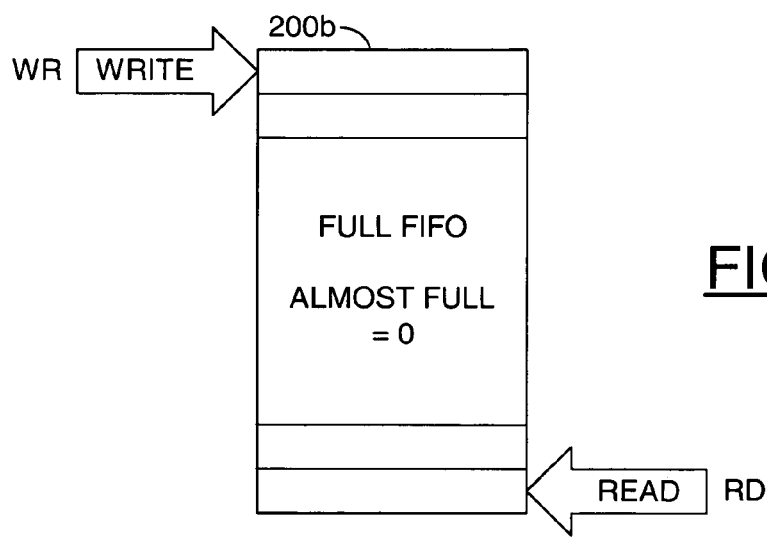
Figure 3C:
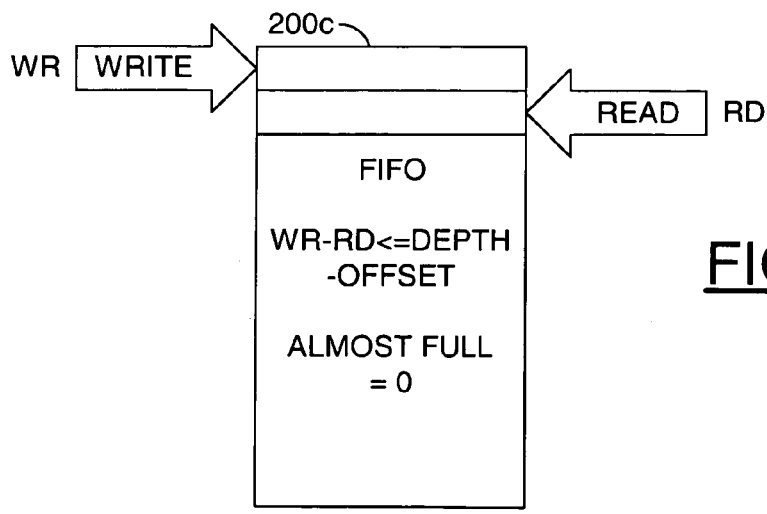

Referring to FIGS. 3(a–c), block diagrams illustrating an exemplary operation of the circuit 100 within a number of FIFOs 200a–200c is shown. Each of the FIFOs 200a–200n may receive a write pointer (e.g., WR) and a read pointer (e.g., RD). The FIFO 200a of FIG. 3a may be empty. The almost full flag FULL may be active HIGH, indicating that the FIFO 200a is enabled. The FIFO 200b of FIG. 3b may be almost full. The almost full flag FULL may be active LOW, indicating that the FIFO 200b is disabled. The FIFO 200c of FIG. 3c may be almost full. The FIFO 200c may determine almost full status in response to the write pointer WR, the read pointer RD, an offset value OFFSET and a depth value DEPTH. The state of the almost full status flag FULL is determined as follows:

FULL=(WR−RD)>(DEPTH−OFFSET)

The almost full flag FULL of the FIFO 200c may be a logic LOW, indicating that the FIFO 200c is disabled. The circuit 100 may allow the FIFOs 200a–200c to operate at a high speed (e.g., 266 Mhz, 3.76 ns cycle). The asynchronous state machines 108 and 110 may allow the circuit 100 to operate at high speeds.

The circuit 100 may implement the comparator 106 to generate the look ahead signal EQ needed by the flag generation circuitry (e.g., the state machines 108 and 110). The circuit 100 may implement the asynchronous state machines 108 and 110 to generate the almost full status flag FULL. The circuit 100 may preload the user programmable "inverted" offset directly into the read load/counter 102 upon programming. The circuit 100 may also implement a shadow register (not shown) to store the "inverted" offset value, such that the value may be re-loaded back into the read load/counter 102 upon retransmit and partial reset operations. The circuit 100 may allow high speed almost full flag generation in order to achieve high speed operation. Additionally, since the circuit 100 does not implement an adder, logic hazards (e.g., glitches) may be minimized.

The various signals of the present invention are generally "on" (e.g., a digital HIGH, or 1) or "off" (e.g., a digital LOW, or 0). However, the particular polarities of the on (e.g., asserted) and off (e.g., de-asserted) states of the signals may be adjusted (e.g., reversed) accordingly to meet the design criteria of a particular implementation. Additionally, inverters may be added to change a particular polarity of the signals.

While the invention has been particularly shown and described with reference to the preferred embodiments thereof, it will be understood by those skilled in the art that various changes in form and details may be made without departing from the spirit and scope of the invention.

The invention claimed is:

1. An apparatus comprising:
a comparator configured to assert a compare signal when a read count signal matches a write count signal; and
a flag generation circuit connected to said comparator and configured to assert a full flag signal in response to (i) a read clock signal, (ii) a write clock signal and (iii) said compare signal, wherein said compare signal comprises a look ahead compare signal.

2. The apparatus according to claim 1, wherein said comparator is further configured to perform a bitwise comparison between said read count signal and said write count signal.

3. The apparatus according to claim 1, wherein said flag generation circuit comprises:
a set state machine configured to generate a first pulse configured to generate a first predetermined state of said full flag signal in response to said compare signal; and
a reset state machine configured to generate a second pulse configured to generate a second predetermined state of said full flag signal in response to said compare signal.

4. The apparatus according to claim 3, wherein:
said set state machine is configured to generate said first pulse at a rising edge of said write clock signal; and
said reset state machine is configured to generate said second pulse at a rising edge of said read clock signal.

5. The apparatus according to claim 4, further comprising:
a synchronization circuit configured to synchronize said second pulse with said write clock signal.

6. The apparatus according to claim 5, further comprising:
a latch configured to generate said flag signal, wherein said latch is reset in response to said first pulse and set in response to said second pulse received from said synchronization circuit.

7. The apparatus according to claim 1, further comprising:
a read load/counter configured to generate said read count signal in response to both a preloaded offset value and a count of said read clock signal; and
a write counter configured to generate said write count signal in response to a count of said write clock signal.

8. The apparatus according to claim 7, further comprising:
a shadow register configured to store said offset value.

9. The apparatus according to claim 1, wherein said full flag signal comprises a programmable almost full status flag.

10. A method for providing programmable full flag generation, comprising the steps of:

(A) asserting a compare signal when a read count signal and a write count signal are equal; and
(B) asserting a full flag signal in response to all of a read clock signal, a write clock signal and said compare signal, wherein step (B) further comprises (i) generating a first pulse configured to generate a first predetermined state of said full flag signal in response to both said compare signal and said write clock signal and (ii) generating a second pulse configured to generate a second predetermined state of said full flag signal in response to both said compare signal and said read clock signal.

11. The method according to claim 10, wherein said full flag signal comprises a programmable almost full-status flag.

12. The method according to claim 10, wherein said read count signal is generated by:
preloading an offset value; and
counting pulses of said read clock signal.

13. The method according to claim 10, wherein said write count signal is generated by:
counting pulses of said write clock signal.

14. The method according to claim 10, wherein step (B) further comprises:
synchronizing said second pulse to said write clock signal.

15. The method according to claim 14, wherein step (B) further comprises:
generating said full flag signal using a latch;
resetting said latch in response to said first pulse; and
setting said latch in response to said second pulse as synchronized to said write clock signal.

16. The method according to claim 10, wherein step (B) further comprises:
asserting said full flag signal in a first state in response to said compare signal indicating that said read count signal matches said write count signal.

17. The method according to claim 16, wherein step (B) further comprises:
maintaining said full flag signal in said first state from after said compare signal indicates that said read count signal does not match said write count signal until a subsequent edge of said write clock signal.

18. An apparatus comprising:
a comparator configured to assert a compare signal when a read count signal matches a write count signal; and
a flag generation circuit connected to said comparator and configured to assert a full flag signal in response to (i) a read clock signal, (ii) a write clock signal and (iii) said compare signal, wherein said full flag signal comprises a programmable almost full status flag.

* * * * *